United States Patent [19]

McGinnis

[11] Patent Number: 4,986,156

[45] Date of Patent: Jan. 22, 1991

[54] MAT CUTTING DEVICE

[76] Inventor: Michael J. McGinnis, 887 Boyd St., Santa Rosa, Calif. 95407

[21] Appl. No.: 508,658

[22] Filed: Apr. 13, 1990

[51] Int. Cl.$^5$ .......................... B26D 7/01; B26D 7/26
[52] U.S. Cl. .................................... 83/467.1; 83/468; 83/581; 83/468.1
[58] Field of Search ...................... 83/745, 743, 467.1, 83/468.1, 468, 455, 581, 614; 30/293

[56] References Cited

U.S. PATENT DOCUMENTS

| | | | |
|---|---|---|---|
| 491,307 | 2/1893 | Gaylord | 83/648 |
| 3,739,678 | 6/1973 | Kankaapaa | 83/745 |
| 3,779,119 | 12/1973 | Broides | 83/581 |
| 4,038,751 | 8/1977 | Albright | 83/614 |
| 4,064,626 | 12/1977 | Meshulam et al. | 30/287 |

Primary Examiner—Frank T. Yost
Assistant Examiner—John M. Husar
Attorney, Agent, or Firm—Richard C. Litman

[57] ABSTRACT

An apparatus for cutting properly sized artwork mats utilizes a pivoting cutter guide that has only one locking point and scale rule. Such apparatus quickly speeds up the process and increases the ease at which artwork mats are prepared. Included with the apparatus is a special conversion ruler that eliminates any need to perform mathematical calculations during the marking and cutting process. A flat surface provided underneath the base of the apparatus acts as a stop for large sheets of mat material when the apparatus is placed atop the sheets. This ensures that straight square cuts are made when cutting up the initial mat stock. A special cutter head allows both bevel and straight cuts to be made on the same guide and cutter head.

7 Claims, 3 Drawing Sheets

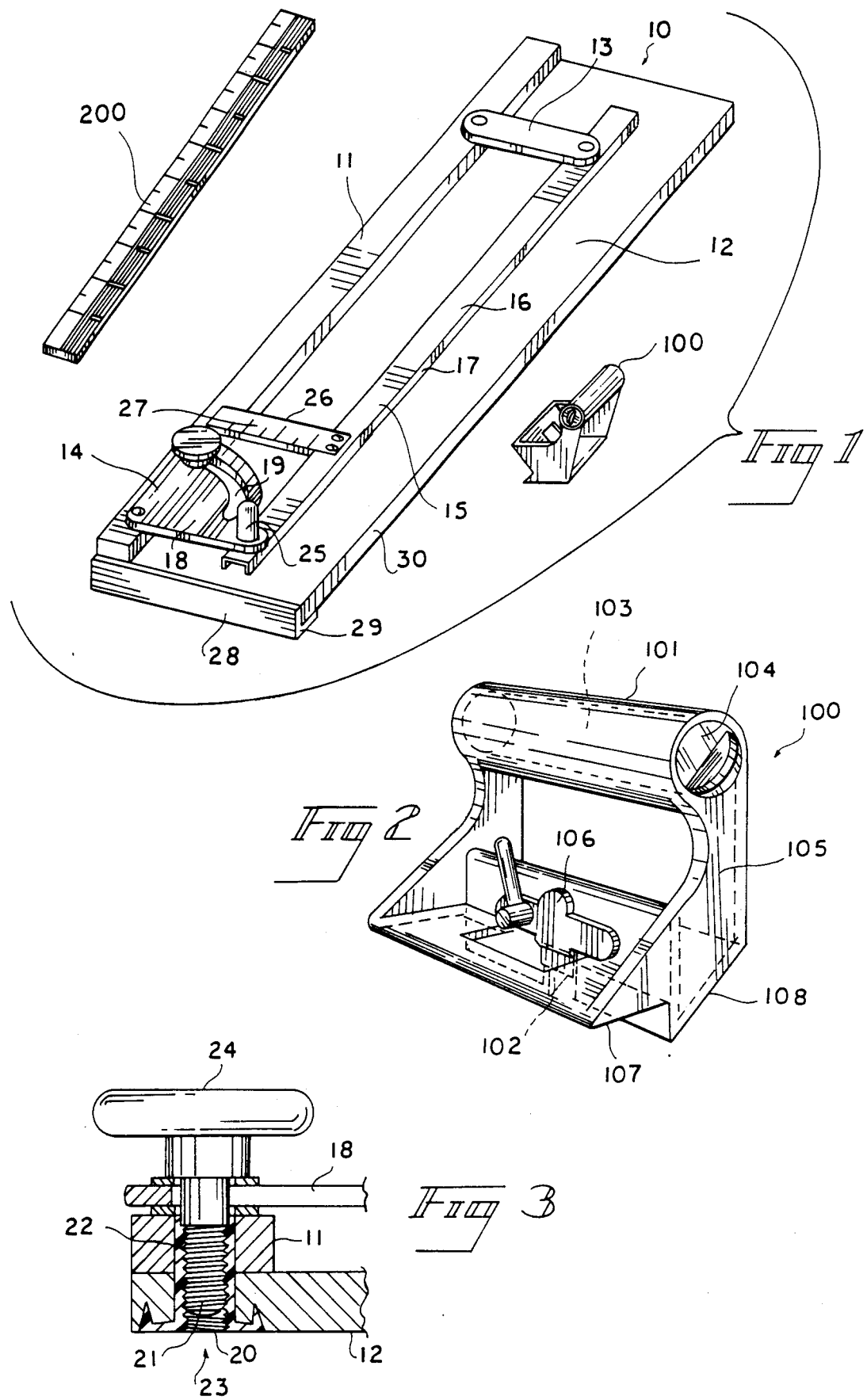

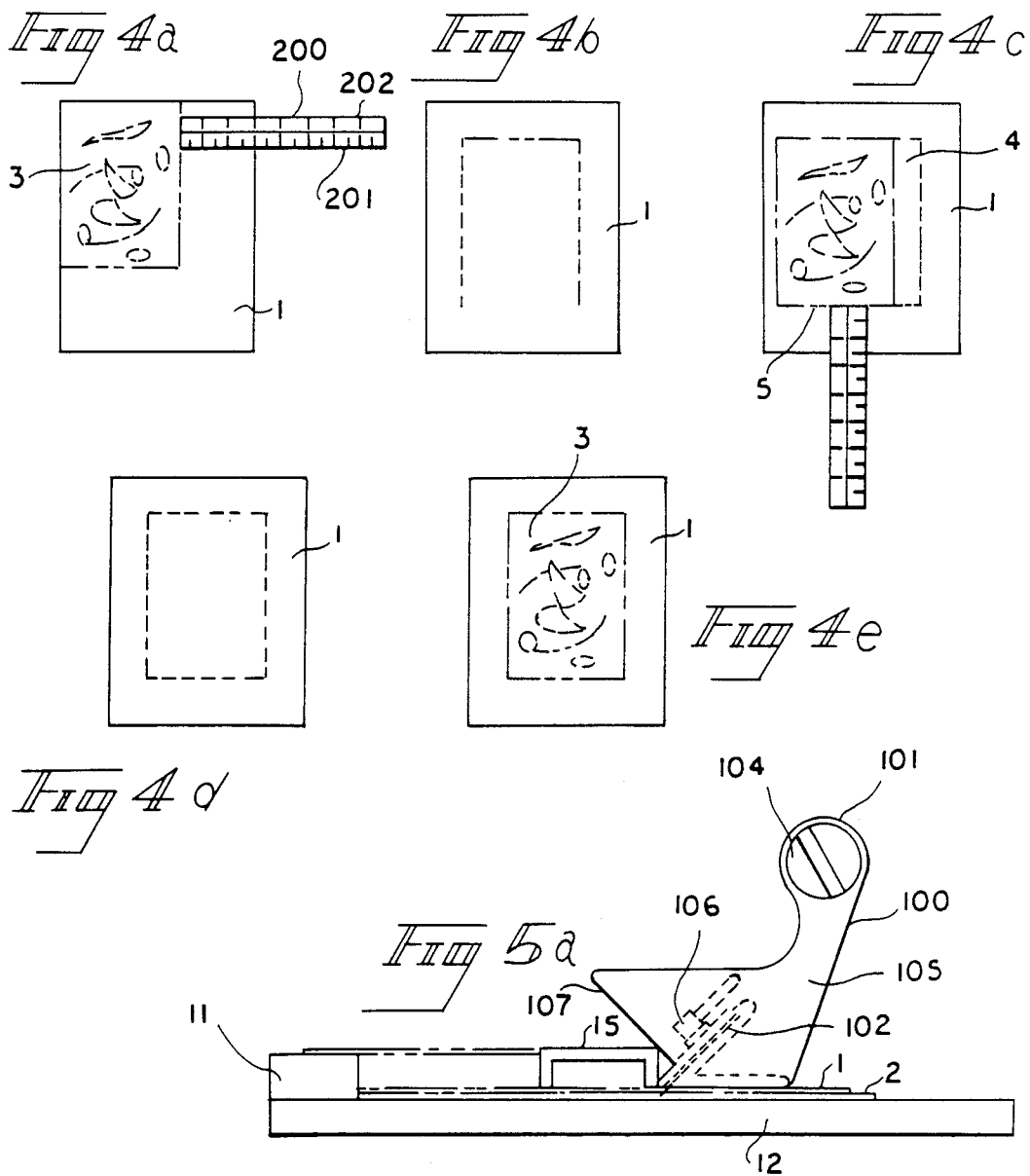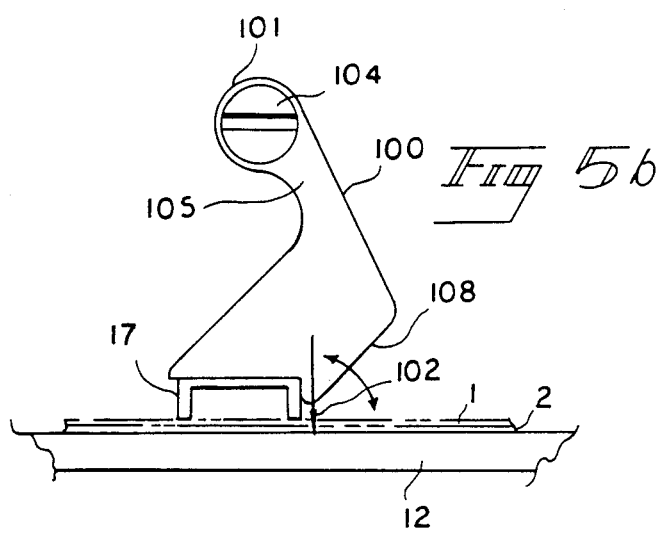

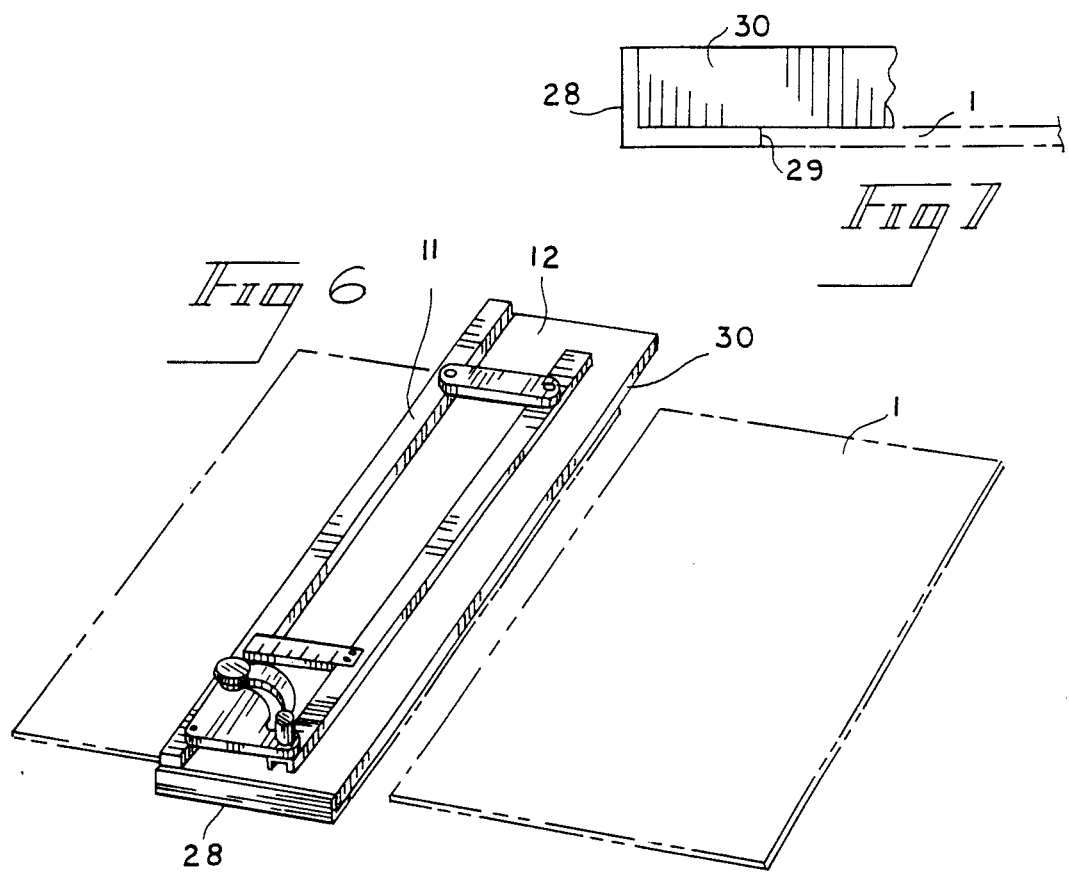

MAT CUTTING DEVICE

BACKGROUND OF THE INVENTION

1. Field of the Invention

The present invention relates to cutting devices used to cut flat horizontal layers of material. More particularly, it relates to cutters used to accurately measure and cut backing mats for flat artwork that is to be displayed in a frame format.

2. Description of the Prior Art

Numerous mat cutting devices are presently available on the market. Two of these known devices are sold under the names of ALTO'S EZ MAT CUTTER (U.S. Pat. No. 4,038,751) and LEICHTUNG MAT-CUTTING SYSTEM. These devices both employ two parallel straight arms that are adjustably connected by means of two locking racks. Both of these devices have two locking points. The arms of these cutting devices are provided with two linear scales to measure the dimensions of the mats and to make sure that the two arms are not misaligned. The EZ MAT CUTTER suffers from the weakness of having only a finite number of settings due to the peg type locking mechanism it utilizes.

Further devices relating to this field can be found in U.S. Pat. Nos. 513, 851 issued to Wheeler and 280,328 issued to Putnam. Neither of these devices relates closely to the applicant's unique device for cutting mats. The Wheeler device lacks the pivoting means that is unique about the applicants cutter. The Putnam device is a chart holder and protractor that utilizes a complicated mechanism to locate navigational points on a map. Additional devices are disclosed in Pat. Nos. 491,307 issued to Gaylord and 4,747,330 issued to Carithers. Again, neither of these devices disclose applicant's system of cutting artwork mats.

SUMMARY OF THE INVENTION

Applicant's unique mat cutter uses two parallel arms that are pivotally connected, therefore eliminating the need for the double linear racks of the prior art devices. Applicant's mat cutter has only one locking point and one ruler to close all four pivot points, as opposed to the two locking points and two distant rulers which are necessary in the prior art in order to assure that there is no misalignment in the two arms and that cuts will be parallel to the border of the mat. Included with the mat cutting layout is the cutting tool which rides upon one of the parallel arms to make the appropriate cut in the backing mat.

Applicant presents a novel method of preparing artwork mats that eliminates the mathematical steps that were required beforehand in properly measuring the dimensions of the mats. An important feature of this method is the use of a conversion ruler allowing fast mat border measurements to be made.

Accordingly, it is one object of the present invention to provide a mat cutting device that utilizes two pivoting parallel arms to set up the dimensions of the backing mat to be cut.

It is an object of the present invention to provide a mat cutting device that requires only one locking point to insure accurate parallel alignment of the two parallel arms.

It is another object of the present invention to provide a mat cutting device that has a special conversion ruler that can quickly find the necessary border space on each side of a mat.

It is a further object of the present invention to provide a cutting tool for a mat cutting device that can provide for both bevel and straight cuts into artwork mats, and requires no blade adjustment.

It is a still further object of the present invention to provide a method of quickly and accurately cutting mats for artwork that eliminates the need for addition, subtraction and division of fractional numbers.

It is another object of the present invention to provide an apparatus capable of reducing large sheets of mat board material to workable size.

It is an object of the present invention to provide an apparatus that provides multiple mat cutting functions in one single device.

These and other objects of the present invention will become readily apparent upon further review of the following specification and drawings.

BRIEF DESCRIPTION OF THE DRAWINGS

FIG. 1 shows a perspective view of the present invention including the special conversion ruler, mat cutting guide and the bladed cutting head.

FIG. 2 is a perspective view of the cutting head.

FIG. 3 is a cross sectional view of the locking knob assembly.

FIGS. 4a–4e illustrate the steps of the new method of preparing mats for artwork.

FIGS. 5a–5b shows the various ways in which cutter head can be used in conjunction with the mat cutting guide.

FIG. 6 shows a perspective view of the mat cutting guide being used to reduce large sheets of mat material down to usable sizes.

FIG. 7 shows a cross-sectional view of the mat cutting guide abutted against a large sheet of mat board material.

Similar reference characters denote corresponding features consistently throughout the attached drawings.

A DETAILED DESCRIPTION OF THE PREFERRED EMBODIMENT

The present invention includes a unique guide assembly 10 shown in FIG. 1 along with the cutter head 100 and the conversion ruler 200. The cutting guide assembly 10 includes the matboard stop 11 against which the mats 1 are placed to be measured and eventually cut. Matboard stop 11 is mounted onto a main guide body or base 12 upon which the mats 1 will lay. The base 12 can be constructed of laminated or painted wood to provide an attractive appearance. Matboard stop 11 is securely bolted to the base 12. Pivotally attached at nearly opposite ends of the matboard stop 11 are a pivot arm 13 and a locking pivot arm assembly 14. Disposed between the pivoting arms 13, 14 are the cutting tool guide fence 15 on which the cutting head 100 is placed to make the various cuts to produce properly sized artwork mats 1. Cutting tool guide fence 15 is a formed Aluminum member having a flat top surface 16 and side surfaces 17 against which the cutter head 100 rests when making either straight or bevel type cuts into the mats 1. The specific positioning of the cutter head will be discussed later on.

The pivoting locking assembly 14 is unique in that it eliminates the need for two locking assemblies as was done in prior art mat cutting devices. It comprises a flat planar member 18 having a curved slot 19. In this slot rides the locking shaft 20. The locking shaft 20, shown in FIG. 3, has screw threads 21 disposed along its length which mate with respective threads 22 on a bore 23 in the matboard stop 11 and the base 12. Knob 24 serves to tighten or loosen the shaft 20 against the planar member 18, thereby locking or loosening the pivoting arms 14, 13 and allowing positional adjustment of the cutting tool guide fence 15. The user of the cutting device 10 need only to adjust this one knob member 24 to position the device 10 over a mat 1. Knob 25 is used to physically move the cutting tool guide fence into position. Since all the arms 13, 14 are pivotally mounted, there is no error inherent due to a sliding motion which is present in the prior art.

Bolted flush to the cutting tool guide fence 15 is a cutting width ruler 26. The ruler 26 has imprinted on it dimensional hash marks 27 of either a Metric or an English scale. This ruler 26 is used to quickly measure dimensions that are needed after which the locking knob 24 can lock the cutting tool guide fence 15 into position over the mat 1. Ruler 26 being bolted flush to the cutting tool guide fence 15 present a smooth surface for cutting head 100 to run across between pivot arms 13, 14.

Cutter head 100 is shown in FIG. 2 has a handle 101 having an internal storage compartment 103 for the extra blades 102 that would be used with the cutter head 100. Compartment 103 has a removable cap 104 that closes the compartment 103. The side supports 105 at either side of the handle 101 hold between them the blade clamping mechanism 106 which secures the blade 102 in a cutting position. The cutter head 100 has two principal surfaces, the straight cut surface 107 and the bevel cut surface 108. These dual surfaces allow the cutter head to make both types of mat cuts.

FIG. 5 illustrates how the cutter is used with the cutter tool guide fence 15. FIG. 5a illustrates the cutter being placed on surface 108 against the guide fence side 17. Holding the cutter head 100 in this position allows the blade to remain at a specific angle when cutting the mat 1. As a rule of practice a scrap piece of matboard 2 should be placed beneath the mat 1 to be cut. This practice prevents the blade 102 from marring the surface of the base 12. FIG. 5b shows the cutter head 100 sitting upon surface 107 for a straight cut. Surface 107 sits upon the top surface 16 of the cutting tool guide fence 15. Blade 102 is now in normal relationship with the mat 1. This cutter head 100 allows both types of cuts to be made without having to switch cutters or guides.

A description of practicing the technique for cutting mats with the present invention will now follow. First lay the left edge of the picture 3 on a mat 1 that is presized for the cutting guide 10 so that the edge is even with that of the mat, as shown in FIG. 4a. Measure the leftover space on the mat using the special conversion ruler 200. This special conversion ruler has a dual scale, one side 201 is in normal inches or centimeters and the other scale 202 is in a 1:2 ratio. A measure of 1 on the second scale 202 corresponds to a measure of 2 on the first scale 201. The second scale 202 directly reads the halved dimension of any leftover space without having to resort to mathematical calculations.

Set the guide assembly 10 for this dimension using this dimension using the ruler 26. Put the mat into its normal cutting position in the guide assembly 10 and mark the top and side borders with a pencil run along the guide fence 17. This marks the borders on the mat 1 as shown in FIG. 4b. Next lay the picture 3 on the mat, as shown in FIG. 4c, so that the top edge of the picture 3 is even with the top line 4. Measure the space between the bottom of the picture 5 and the bottom of the mat, using the normal scale 201. This is the bottom dimension.

Now set the guide assembly 10 for the bottom dimension and cut the mat, as shown in FIG. 4d. Set the guide assembly 10 to the top and side dimensions and cut the final mat shape, as shown in FIG. 4e. Whether the cuts are straight or bevel is up to the person making the mat to decide. Notice that throughout the whole procedure, no mathematical manipulation needed to be performed at all. Thus, a great deal of time was not wasted in calculating various measurements.

A final feature is the ability to properly size and cut matboards from large sheets of matboard material. The base 12 has disposed on the end an angle iron 28 that completely covers the edge of the base 12 as shown in FIGS. 1 and 6. This angle iron 28 presents a face 29 against which a large sheet of matboard 1 can be placed flush when the base is placed on top of the matboard material 1. The cutting tool 100 can then be run down the side of the base 30 to produce a straight cut. Large sheets of matboard material 1 can then be sectioned off quickly and accurately without having to use a T-square.

It is to be understood that the present invention is not limited to the sole embodiment described above, but encompasses any and all embodiments within the scope of the following claims.

I claim:

1. A cutting assembly for sizing and cutting mats for flat artwork, including:
   a flat horizontal base surface having upper and lower surfaces;
   a first stop means affixed atop said flat horizontal base surface on said upper surface for placing an edge of a flat planar mat against;
   two pivoting arms pivotally connected at one end to said first stop means, said pivoting arms disposed at substantially opposite ends of said first stop means;
   a guide member pivotally connected to said pivoting arms other ends, said first stop means and said guide member being in parallel relationship at all times;
   locking means disposed on one of said pivoting arms to lock said pivoting arms and said guide member in place; whereby
   a mat is placed against said first stop means and under said guide member with said guide member being moved to an appropriate position and locked in place by said locking means, a cut then being made by a cutting tool using said guide member as guide; and
   a straight surface normal to said horizontal base surface affixed to said lower surface, said straight normal surface providing a second stop for large planar sheets of material when said cutting assembly is placed atop the sheets of material, thus allowing straight cuts to be made in the sheets of material.

2. The cutting assembly according to claim 1, wherein:
   said first stop means is a straight elongated member having flat surfaces.

3. The cutting assembly according to claim 1, wherein:

said guide member is a straight elongated member having flat surfaces.

4. The cutting assembly according to claim 3, including:

ruler means affixed to said guide member in a normal relationship, said ruler means being flush with the surface of said guide member.

5. The cutting assembly according to claim 1, wherein:

one of said pivoting arms includes a flat planar member having an arcuate slot through which a threaded shaft member is disposed, said shaft member having a knob disposed atop it above said planar member such that rotation of said shaft causes said knob to clamp down upon said planar member to lock said pivoting arms and said guide member in place.

6. The cutting assembly according to claim 3 including in combination:

a cutting tool comprising a handle means, a body means that contains a sharpened blade and two adjacent surfaces that are disposed at different angles in relation to one another, one said surface when placed upon said guide member causes said cutting tool to make a straight cut in said mat, the other of said surfaces when placed upon said mat adjacent said guide member produces a bevel cut in said mat.

7. The cutting assembly according to claim 1 including in combination:

a ruler having two scales upon it, one of said scales being a conventional scale and the other said scale being of a ratio of 1:2 in relation to said one scale.

* * * * *